United States Patent
Kuang

(10) Patent No.: US 10,476,664 B2
(45) Date of Patent: Nov. 12, 2019

(54) METHODS AND SYSTEMS FOR DATA PROTECTION

(71) Applicant: Quantropi Inc., Ottawa (CA)

(72) Inventor: Randy Kuang, Ottawa (CA)

(73) Assignee: Quantropi Inc., Ottawa (CA)

(*) Notice: Subject to any disclaimer, the term of this patent is extended or adjusted under 35 U.S.C. 154(b) by 38 days.

(21) Appl. No.: 15/796,577

(22) Filed: Oct. 27, 2017

(65) Prior Publication Data

US 2019/0132117 A1     May 2, 2019

(51) Int. Cl.
H04L 9/00 (2006.01)
H04L 9/06 (2006.01)
H04L 9/30 (2006.01)
H04L 9/14 (2006.01)

(52) U.S. Cl.
CPC .............. H04L 9/0631 (2013.01); H04L 9/14 (2013.01); H04L 9/30 (2013.01)

(58) Field of Classification Search
CPC ............ H04L 9/14; H04L 9/30; H04L 9/0631
See application file for complete search history.

(56) References Cited

U.S. PATENT DOCUMENTS

| | | | | |
|---|---|---|---|---|
| 6,937,273 B1 * | 8/2005 | Loui | ............... | G11B 27/034 348/220.1 |
| 8,169,887 B2 * | 5/2012 | Tsai | ............... | H04L 5/003 370/203 |
| 10,271,088 B2 * | 4/2019 | Ellis | ............... | H04N 21/4227 |
| 2002/0023220 A1 | 2/2002 | Kaplan | | |
| 2002/0090203 A1 | 7/2002 | Mankovitz | | |
| 2006/0031737 A1 | 2/2006 | Chugg et al. | | |

(Continued)

FOREIGN PATENT DOCUMENTS

| | | |
|---|---|---|
| CA | 2 638 134 A1 | 1/2010 |
| CN | 101610510 A | 12/2009 |
| CN | 101610510 B | 6/2012 |

OTHER PUBLICATIONS

Martinelli, Encryption Algorithms and Permutation matrices. Haiku Laboratories. http://www.haikulabs.com/encrmat4.htm Jun. 2003. Last accessed Oct. 24, 2017. 4 pages.

(Continued)

*Primary Examiner* — Beemnet W Dada
(74) *Attorney, Agent, or Firm* — Wolf, Greenfield & Sacks, P.C.

(57) ABSTRACT

A communication system, comprising a first apparatus and a second apparatus. A processing entity of the first apparatus is configured for: obtaining a first bit stream; subdividing it into a plurality of N-bit input segments; for each of the input segments, determining an input index as a value represented by the N bits of a particular input segment, determining an output index based on the input index and a mapping between $2^N$ possible input indexes and $2^N$ possible output indexes, and setting bits of a corresponding N-bit output segment so as to represent the value of the output index; and causing transmission of a second bit stream formed using each corresponding first output segment to the second apparatus, where a similar operation is performed to recover the N-bit first input segments.

41 Claims, 10 Drawing Sheets

(56) References Cited

U.S. PATENT DOCUMENTS

| | | |
|---|---|---|
| 2010/0005132 A1 | 1/2010 | Choi et al. |
| 2010/0239092 A1 | 9/2010 | Kuang |
| 2014/0281367 A1 | 9/2014 | Johnson et al. |
| 2015/0089223 A1 | 3/2015 | Tasher et al. |
| 2015/0350655 A1* | 12/2015 | Huang ................. H04N 19/146 375/240.12 |
| 2017/0353302 A1 | 12/2017 | Fernandez et al. |

OTHER PUBLICATIONS

International Search Report and Written Opinion for International Application No. PCT/CA2018/051339 dated Jan. 31, 2019.
International Search Report and Written Opinion for International Application No. PCT/CA2019/050093 dated May 1, 2019.
Cheng et al., Securing the Internet of Things in a Quantum World. Internet of Things. IEEE Communications Magazine. Feb. 2017. 5 pages. DOI: 10.1109/MCOM.2017.1600522CM.

* cited by examiner

| 402 | |
|---|---|
| x | y |
| 0 | 3367 |
| 1 | 128 |
| ... | ... |
| $2^N-2$ | 1007 |
| $2^N-1$ | 22 |

FIG. 4A

$$g \quad\quad\quad x \quad\quad\quad P \quad\quad\quad = \quad\quad g^*$$

$$[01000000] \times \begin{bmatrix} 8 \times 8 \\ \text{PERMUTATION} \\ \text{MATRIX} \end{bmatrix} = [10000000]$$

FIG. 4B

METHODS AND SYSTEMS FOR DATA PROTECTION

FIELD

The present invention relates in general to data protection and, in particular, to data encoding and decoding.

BACKGROUND

Current data encryption technologies rely on the solution of complex numerical problems that present a formidable challenge to solve by brute force. Yet, when armed with a "key" to the solution, a legitimate user can easily gain access to the original, unencrypted data. This is the principle behind technologies such as AES (Advanced Encryption Standard), according to which data can be safely transmitted in encrypted form. However, the security provided by AES and other encryption technologies lasts only as long as a malicious party that intercepts the encrypted data does not have enough computing power and enough target data available to actually solve the problem in a brute force way (i.e., without the required key, but by trying all key possibilities until eventually the correct one is reached).

To hedge against the inevitable increases in computing power at the disposal of malicious parties worldwide (and which is poised to increase further still with the advent of quantum computers), those with a need for secure communications typically seek to increase the complexity of the numerical problems being presented for solution. However, one side effect of this escalation in problem complexity is that a legitimate user, i.e., one with the required key, must also now expend increasingly significant resources to protect and decrypt the data. Thus, while the resources needed by a legitimate user are still designed to be less than the resources needed to solve the problem by brute force, they present a non-negligible "tax" on various performance parameters such as throughput and energy consumption.

As such, a highly secure yet computationally economical data protection solution would be welcomed by the industry.

SUMMARY

According to a broad non-limiting aspect, there is provided a data protection method comprising: storing in a computer memory a mapping between $2^N$ possible input indexes and $2^N$ possible output indexes; obtaining an input bit stream; subdividing the input bit stream into a plurality of N-bit input segments stored in the computer memory, N being an integer greater than one; producing, by one or more processors, a plurality of N-bit output segments corresponding to respective ones of the N-bit input segments, the N-bit output segments stored in the computer memory, wherein a particular one of the N-bit output segments is produced from a particular one of the N-bit input segments by the one or more processors by: determining an input index as a value represented by the N bits of the particular one of the N-bit input segments; determining an output index based on the input index and the mapping; and setting the bits of the particular one of the N-bit output segments so as to represent the value of the output index; and outputting an output bit stream formed using the N-bit output segments.

The data protection method may be implemented in a first device, the method further comprising sending the output data stream towards a second device and sending data indicative of the mapping to the second device for recovering the N-bit input segments from the N-bit output segments obtained from the output data stream.

The data protection method may further comprise encrypting the data indicative of the mapping prior to sending it to the second device.

Encrypting the data indicative of the mapping prior to sending it to the second device may comprise using a private key of a private key/public key pair to encrypt the mapping, the private key being uniquely known to the first device, the public key being made available to the second device.

The data protection method may further comprise carrying out a handshaking protocol with the second device prior to the outputting so as to securely transmit the mapping to the second device.

The data protection method may further comprise storing the data indicative of the mapping as a permutation matrix in a memory, wherein determining the output index based on the input index and the data indicative of the mapping comprises creating a $2^N$-length input vector with all zeroes except for a "1" in a single position corresponding to the input index, multiplying the permutation matrix and the input vector to obtain a $2^N$-length output vector having all zeroes except for a "1" in a single position, wherein the output index is set to equal the position in which the "1" appears in the output vector.

Determining the input index as the value of the particular one of the N-bit input segments may comprise computing the decimal value of the binary value represented by the N bits of the particular one of the N-bit input segments.

The mapping may be a one-to-one mapping.

Producing the plurality of N-bit output segments corresponding to respective ones of the N-bit input segments may comprise: creating a succession of arrays of size $2^N$, each array corresponding to one of the N-bit input segments and having all zeroes except for a "1" in a single position corresponding to the input index; applying each of the arrays to inputs of a $2^N$-input, $2^N$-output switch fabric that implements the mapping, thereby to obtain a succession of output arrays at the outputs of the switch fabric, each of the arrays having all zeroes except for a "1" in a single position; setting the output index for each of the N-bit output segments to correspond to the position in which the "1" appears in a corresponding one of the output arrays.

N may be at least as great as 10, at least as great as 14 or at least as great as 20.

The data protection method may further comprise, before the subdividing: encrypting the input bit stream with an encryption key.

The data protection method may further comprise, before the outputting: encrypting the output bit stream with an encryption key.

The data protection method may be implemented in a mobile communication device.

The data protection method may be implemented in a smartphone.

According to a broad non-limiting aspect, there is provided an apparatus comprising a processor coupled to a memory, the memory storing computer-readable instructions and a mapping between $2^N$ possible input indexes and $2^N$ possible output indexes, N being an integer greater than one, the processor being configured to execute the computer-readable instructions thereby to implement a method that comprises: obtaining an input bit stream; subdividing the input bit stream into a plurality of N-bit input segments; for each of the N-bit input segments, determining an input index as a value represented by the N bits of a particular one of the N-bit input segments, determining an output index based on the input index and the mapping, and setting bits of a corresponding N-bit output segment so as to represent the value of the output index; and outputting an output bit stream formed using each corresponding N-bit output segment.

According to a broad non-limiting aspect, there is provided a computer-readable medium comprising computer-readable instructions which, when executed by a processing entity, cause the processing entity to carry out a method that comprises: obtaining an input bit stream; subdividing the input bit stream into a plurality of N-bit input segments, N being an integer greater than one; producing a plurality of N-bit output segments corresponding to respective ones of the N-bit input segments, wherein a particular one of the N-bit output segments is produced from a particular one of the N-bit input segments by: determining an input index as a value represented by the N bits of the particular one of the N-bit input segments; determining an output index based on the input index and a mapping between $2^N$ possible input indexes and $2^N$ possible output indexes; setting the bits of the particular one of the N-bit output segments so as to represent the value of the output index; outputting an output bit stream formed using the N-bit output segments.

According to a broad non-limiting aspect, there is provided a data protection method comprising: using non-human electricity to store a mapping in a computer memory between $2^N$ possible input indexes and $2^N$ possible output indexes; using non-human electricity to obtain an input bit stream; using non-human electricity to subdivide the input bit stream into a plurality of N-bit input segments stored in the computer memory, N being an integer greater than one; using non-human electricity to produce a plurality of N-bit output segments corresponding to respective ones of the N-bit input segments and to store the N-bit output segment in the computer memory, wherein a particular one of the N-bit output segments is produced from a particular one of the N-bit input segments by: determining an input index as a value represented by the N bits of the particular one of the N-bit input segments; determining an output index based on the input index and the mapping; setting the bits of the particular one of the N-bit output segments so as to represent the value of the output index; using non-human electricity to output an output bit stream formed using the N-bit output segments; using non-human electricity to convert the output bit stream into an output signal; and using non-human electricity to release the output signal onto a physical medium.

According to a broad non-limiting aspect, there is provided a communication system, comprising: a first apparatus comprising a first processing entity coupled to a first memory; and a second apparatus comprising a second processing entity coupled to a second memory; wherein the first and second apparatuses communicate over a communication channel; wherein the first memory stores first computer-readable instructions and a first mapping between $2^N$ possible input indexes and $2^N$ possible output indexes, N being an integer greater than one; wherein the second memory stores second computer-readable instructions and a second mapping between $2^N$ possible input indexes and $2^N$ possible output indexes, the second mapping being derivable from the first mapping; wherein the first processing entity is configured for: obtaining a first bit stream; subdividing the first bit stream into a plurality of N-bit first input segments; for each of the N-bit first input segments, determining a first input index as a value represented by the N bits of a particular one of the N-bit first input segments, determining a first output index based on the first input index and the first mapping, and setting bits of a corresponding N-bit first output segment so as to represent the value of the first output index; and causing a second bit stream formed using each corresponding N-bit first output segment to be transmitted over the communication channel; wherein the second processing entity is configured for: receiving the second bit stream; subdividing the second bit stream into a plurality of N-bit second input segments; for each of the N-bit second input segments, determining a second input index as a value represented by the N bits of a particular one of the N-bit second input segments, determining a second output index based on the second input index and the second mapping, and setting bits of a corresponding N-bit second output segment so as to represent the value of the second output index so as to recover a corresponding one of the N-bit input segments; and outputting a third bit stream formed using each corresponding N-bit second output segment.

The first processing entity may be further configured to send the second mapping to the second apparatus for storage in the second memory.

The first processing entity may be further configured to derive the second mapping from the first mapping.

When the first mapping is represented as a first matrix and the second mapping is represented as a second matrix, the first and second matrices maybe transposes of one another.

The first processing entity may be further configured to send the a transmitted mapping to the second apparatus, the transmitted mapping being the first mapping or the second mapping.

The first processing entity may be further configured to send a flag to the second apparatus, the flag indicating whether the transmitted mapping is the first mapping or a transpose of the first mapping.

The second processing entity may be further configured to process the flag and to store in the second memory the transmitted mapping when the flag indicates that the transmitted mapping is the transpose of the first mapping.

The second processing entity may be further configured to process the flag and to store in the second memory a transpose of the transmitted mapping when the flag indicates that the transmitted mapping is the first mapping.

The first processing entity may be further configured for encrypting data indicative of the transmitted mapping prior to sending it to the second apparatus.

To encrypt the data indicative of the transmitted mapping prior to sending it to the second apparatus, the first processing entity may be configured for using a private key of a private key/public key pair to encrypt the data indicative of the transmitted mapping, the private key being uniquely known to the first apparatus, the public key being made available to the second apparatus.

The first and second processing entities may be configured for carrying out a handshaking protocol with one another to securely transmit the transmitted mapping from the first apparatus to the second apparatus.

The first mapping may be stored in the first memory by a permutation matrix, wherein determining the first output index based on the first input index and the first mapping comprises creating a $2^N$-length input vector with all zeroes except for a "1" in a single position corresponding to the first input index, multiplying the permutation matrix and the input vector to obtain a $2^N$-length output vector having all zeroes except for a "1" in a single position, wherein the first output index is set to equal the position in which the "1" appears in the output vector.

The first and second mappings may each be one-to-one mappings.

For plural successive N-bit first input segments, the first processing entity may be configured for: determining a first input index for each of the first N-bit input segments; creating a succession of arrays of size $2^N$, each array corresponding to one of the N-bit first input segments and having all zeroes except for a "1" in a single position corresponding to the first input index; applying each of the arrays to inputs of a $2^N$-input, $2^N$-output switch fabric that implements the mapping, thereby to obtain a succession of output arrays at the outputs of the switch fabric, each of the arrays having all zeroes except for a "1" in a single position; setting the output index for each of the N-bit output segments to correspond to the position in which the "1" appears in a corresponding one of the output arrays.

N may be at least as great as 10, 14 or 20.

The first processing entity may be further configured encrypting the first bit stream with an encryption key before said subdividing, the second processing entity being further configured for decrypting the third bit stream with a decryption key corresponding to the encryption key, thereby to recover the first bit stream.

The first processing entity may be further configured encrypting the second bit stream with an encryption key before said causing, the second processing entity being further configured for decrypting the received bit stream with a decryption key corresponding to the encryption key prior to said subdividing.

The first and second apparatuses may be mobile communication devices.

At least one of the first apparatus and the second apparatus may be a smartphone.

According to a broad non-limiting aspect, there is provided a data protection method comprising: obtaining an input bit stream; subdividing a first part of the input bit stream into a plurality of N-bit input segments, N being an integer greater than one; producing a plurality of N-bit output segments corresponding to respective first ones of the N-bit input segments, wherein a particular one of the N-bit output segments is produced from a particular one of the N-bit input segments by: determining an input index as a value represented by the N bits of the particular one of the N-bit input segments; determining an output index based on the input index and a mapping between $2^N$ possible input indexes and $2^N$ possible output indexes; setting the bits of the particular one of the N-bit output segments so as to represent the value of the output index; outputting a first part of an output bit stream formed using the N-bit output segments; subdividing a second part of the input bit stream into a plurality of M-bit input segments, M being an integer greater than one; producing a plurality of M-bit output segments corresponding to respective first ones of the M-bit input segments, wherein a particular one of the M-bit output segments is produced from a particular one of the M-bit input segments by: determining an input index as a value represented by the N bits of the particular one of the M-bit input segments; determining an output index based on the input index and a mapping between $2^M$ possible input indexes and $2^M$ possible output indexes; setting the bits of the particular one of the M-bit output segments so as to represent the value of the output index; outputting a second part of the output bit stream formed using the M-bit output segments.

N and M may be identical, or different, and each may be at least as great as 10, 14 or 20.

The mapping between $2^N$ possible input indexes and $2^N$ possible output indexes may be a first mapping, the mapping between $2^M$ possible input indexes and $2^M$ possible output indexes may be a second mapping, and the method may comprise obtaining the first and second mappings from a server.

The first and second mappings may be obtained from the server over the Internet.

The data protection method may further comprise sending the first and second parts of the output bit stream to a remote device.

The mapping between $2^N$ possible input indexes and $2^N$ possible output indexes may be a first mapping, the mapping between $2^M$ possible input indexes and $2^M$ possible output indexes may be a second mapping, the method may comprise sending the first and second mappings to the remote device.

The mapping between $2^N$ possible input indexes and $2^N$ possible output indexes may be a first mapping, the mapping between $2^M$ possible input indexes and $2^M$ possible output indexes may be a second mapping, and the first and second mappings may be stored in a memory in association with a respective first code and second code, and the method may further comprise sending the first code and the second code to the remote device.

The data protection method may further comprise receiving the first and second parts of the input bit stream from a remote device.

The data protection method may further comprise receiving from the remote device an indication of a separation between the first and second parts of the input bit stream.

The mapping between $2^N$ possible input indexes and $2^N$ possible output indexes may be a first mapping, the mapping between $2^M$ possible input indexes and $2^M$ possible output indexes may be a second mapping, and the method may further comprise receiving the first mapping before producing the plurality of N-bit output segments and receiving the second mapping before producing the plurality of M-bit output segments.

The mapping between $2^N$ possible input indexes and $2^N$ possible output indexes may be a first mapping, the mapping between $2^M$ possible input indexes and $2^M$ possible output indexes may be a second mapping, and the method may further comprise receiving the first and second mappings from the remote device.

The mapping between $2^N$ possible input indexes and $2^N$ possible output indexes may be a first mapping, the mapping between $2^M$ possible input indexes and $2^M$ possible output indexes may be a second mapping, the first and second mappings may be stored in a memory in association with a respective first code and second code, and the method may further comprise receiving the first and second codes from the remote device.

The indication of where the input bit stream is separated between the first and second parts may include the second code.

According to a broad non-limiting aspect, there is provided a method of implementing a secure network amongst a plurality of communication devices, comprising: determining a mapping between $2^N$ possible input indexes and $2^N$ possible output indexes, where N>1; securely embedding the mapping within a memory of each of the communication devices; configuring one or more processors in each of the communication devices to execute a data encoding method when transmitting data to other ones of the communication devices; and configuring one or more processors in each of the communication devices to execute a data decoding method when processing data received from other ones of the communication devices; the data encoding and decoding methods comprising: obtaining an input bit stream; subdividing the input bit stream into a plurality of N-bit input segments; producing a plurality of N-bit output segments corresponding to respective ones of the N-bit input segments, wherein a particular one of the N-bit output segments is produced from a particular one of the N-bit input segments by: determining an input index as a value represented by the N bits of the particular one of the N-bit input segments; determining an output index based on the input index and the mapping; and setting the bits of the particular one of the N-bit output segments so as to represent the value of the output index; and outputting an output bit stream formed using the N-bit output segments.

According to a broad non-limiting aspect, there is provided a network of communication devices, each of the communication devices comprising a processor coupled to a memory and an I/O, the memory storing computer-readable instructions and a mapping between $2^N$ possible input indexes and $2^N$ possible output indexes, N being an integer greater than one, the mapping being common to all of the communication devices, the processor in each of the communication devices being configured to execute the computer-readable instructions thereby to implement a data encoding method for sending data to other ones of the communication devices via the I/O and a data decoding method for processing data received from other ones of the communication devices via the I/O, at least one of the data encoding and decoding methods comprising: obtaining an input bit stream; subdividing the input bit stream into a plurality of N-bit input segments; producing a plurality of N-bit output segments corresponding to respective ones of the N-bit input segments, wherein a particular one of the N-bit output segments is produced from a particular one of the N-bit input segments by: determining an input index as a value represented by the N bits of the particular one of the N-bit input segments; determining an output index based on the input index and the mapping; and setting the bits of the particular one of the N-bit output segments so as to represent the value of the output index; and outputting an output bit stream formed using the N-bit output segments.

Each of the communication devices may be embedded in a vehicle, satellite, smartphone or automatic teller machine.

According to a broad non-limiting aspect, there is provided a computer system comprising a processor and a memory storing computer-readable instructions corresponding to an embedded application localizer and an embedded application loader, the memory further storing a mapping between $2^N$ possible input indexes and $2^N$ possible output indexes, N being an integer greater than one, wherein execution of the application localizer by the processor comprises (i) applying a data protection method to an executable file for an application, thereby to produce a protected file that is not executable; and (ii) storing the protected file in the memory, and wherein execution of the application loader by the processor comprises (i) retrieving the protected file from the memory; (ii) applying a data recovery method to the protected file, thereby to obtain the executable file for the application; and (iii) loading the executable file into a portion of the memory for application execution.

Applying the data protection method to the executable file may comprise: subdividing the executable file into a plurality of N-bit input segments; producing a plurality of N-bit output segments corresponding to respective ones of the N-bit input segments, wherein a particular one of the N-bit output segments is produced from a particular one of the N-bit input segments by: determining an input index as a value represented by the N bits of the particular one of the N-bit input segments; determining an output index based on the input index and the mapping; and setting the bits of the particular one of the N-bit output segments so as to represent the value of the output index; and creating the protected file from the N-bit output segments.

According to a broad non-limiting aspect, there is provided a data protection method comprising: storing, in a computer memory, a mapping between $2^N$ possible input indexes and $2^N$ possible output indexes; obtaining an ordered set of input bits; subdividing the ordered set of input bits into a plurality of N-bit input segments stored in the computer memory, N being an integer greater than one; producing a plurality of N-bit output segments corresponding to respective ones of the N-bit input segments and to store the N-bit output segment in the computer memory, wherein a particular one of the N-bit output segments is produced from a particular one of the N-bit input segments by: expanding one of the N-bit input segments into a $2^N$-bit input segment, applying the mapping to the $2^N$-bit input segment to determine a $2^N$-bit output segment, compressing the $2^N$-bit output segment into an N-bit output segment, forming an ordered set of output bits using the N-bit output segments and releasing the ordered set of output bits and storing the ordered set of output bits in the memory.

BRIEF DESCRIPTION OF THE DRAWINGS

These and other aspects will become apparent from the following description of embodiments in conjunction with the accompanying drawings, wherein:

FIGS. 4A to 4C are block diagrams showing various ways to effect step 240 in FIG. 2, in accordance with various non-limiting embodiments.

The drawings are to be considered as illustrative of certain examples and are not to be considered limiting.

DETAILED DESCRIPTION

Figure 1:
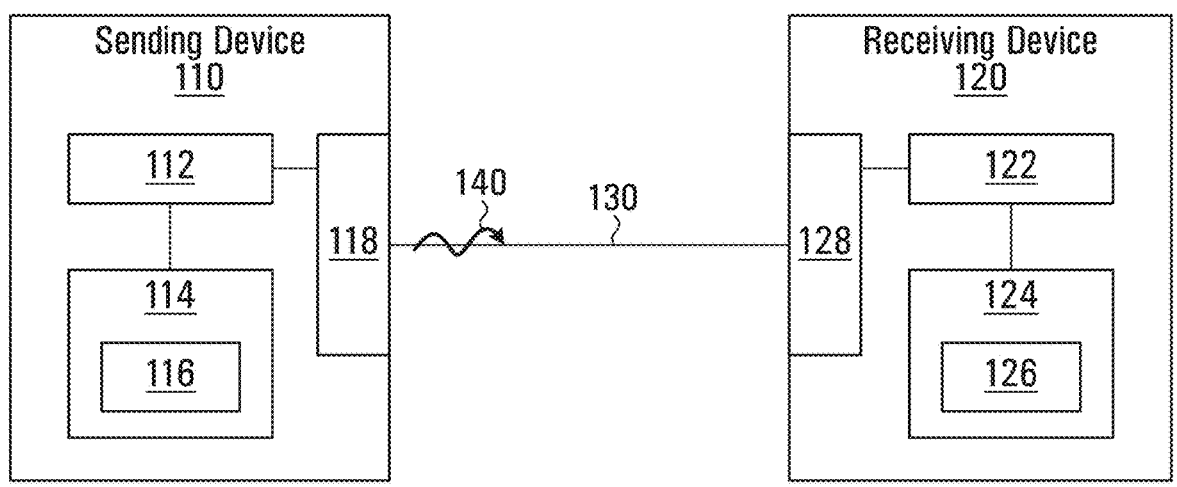
FIG. 1 is a block diagram showing a sending device, a receiving device and a channel.

FIG. 1 shows a communication system that may be configured to incorporate an example non-limiting embodiment of the present invention. Specifically, the system includes a sending device 110, a receiving device 120 and a channel 130 between the sending device 110 and the receiving device 120. The sending device 110 and the receiving device 120 may each be implemented within a mobile phone, smartphone, laptop, desktop, on-board vehicle computer, internet-enabled appliance, etc.

The sending device 110 may release a signal 140 to the receiving device 120 over the channel 130. The signal 140 may be a modulated signal that carries digital data that has been encoded by elements of the sending device 110. The channel 130 may be any suitable communication channel physically implemented using any suitable medium including one or more of wired, RF, fiber optic, free-space optical, acoustic, etc. The channel 130 may be implemented logically as a path over one or more data networks including but not limited to an intranet, a virtual private network and the Internet.

The receiving device 120 may also release a signal (not shown) containing data for the sending device 110 onto the channel 130 such that both the sending device 110 and the receiving device 120 are in bidirectional communication over the channel 130. However, to simplify the description herein below, a description of the generation of a signal by the receiving device 120 for transmission towards the sending device 110 will not be provided, as it would closely match the description of the generation of the signal 140.

In one embodiment, the sending device 110 uses non-human electricity (e.g., DC or AC electricity from a battery, generator, inverter, power lines, photovoltaic cell or electrical transformer) to effect a transformation or change on an input signal carrying an input bit stream, in order to produce an output signal carrying an output bit stream. To this end, the sending device 110 includes a processing entity 112 and a memory 114 that stores computer-readable instructions. The processing entity 112 is configured to execute the computer-readable instructions in the memory 114. In doing so, the processing entity 112 of the sending device 110 causes the sending device 110 to implement a variety of processes, including data processes and control processes. Examples of a processing entity may include electronic components such as a computer processor on a microchip, or a quantum computer. An example of a process that may be implemented by the processing entity 112 includes a data encoding process, described herein below in further detail. The data encoding process may be encoded as a subset 116 of the computer-readable instructions in the memory 114. An input/output (I/O) 118 enables the processing entity 112 to communicate externally and may include a screen (e.g., touchscreen), keyboard/mouse, network interface device/card (e.g., to support NFC, WiFi, Ethernet or cellular/GSM/LTE communications), USB port(s), etc.

For its part, the receiving device 120 also uses non-human electricity to effect a transformation or change on an input signal carrying an input bit stream, in order to produce an output signal carrying an output bit stream. To this end, the receiving device 120 includes a processing entity 122 and a memory 124 that stores computer-readable instructions. The processing entity 122 is configured to execute the computer-readable instructions in the memory 124. In doing so, the processing entity 122 of the receiving device 120 causes the receiving device 120 to implement a variety of processes, including data processes and control processes. Examples of a processing entity may include electronic components such as a computer processor on a microchip, or a quantum computer. An example of a process that may be implemented by the processing entity 122 includes a data encoding process, described herein below in further detail. The data decoding process may be encoded as a subset 126 of the computer-readable instructions in the memory 124. An input/output (I/O) 118 enables the processing entity 122 to communicate externally and may include a screen (e.g., touchscreen), keyboard/mouse, network interface device/card (e.g., to support NFC, WiFi, Ethernet or cellular/GSM/LTE communications), USB port(s), etc.

Components of the sending device 110 (receiving device 120), such as the processing entity 112 (122) and the memory 114 (124) and various other input and other output devices, may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of the sending device 110 and the receiving device 120 may be interconnected by a network. For example, the memory 114 (124) may be comprised of multiple physical memory units located in different physical locations interconnected by a network. Moreover, depending on the exact device configuration and type, the memory 114 (124) may be volatile (such as RAM, for example), non-volatile (such as ROM, flash memory, etc., for example) or some combination of the two. The computer readable instructions stored in the memory 114 (124) may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

It should be appreciated that in some cases, the sending device 110 and the receiving device 120 may be the same computer, the channel 130 may be internal circuitry of the computer, the processing entities 112, 122 may be the same processing entity, the memories 114, 124 may be a common computer memory, and the subsets 116, 126 may be different subsets of the common computer memory.

Data Encoding Process

Figure 2:
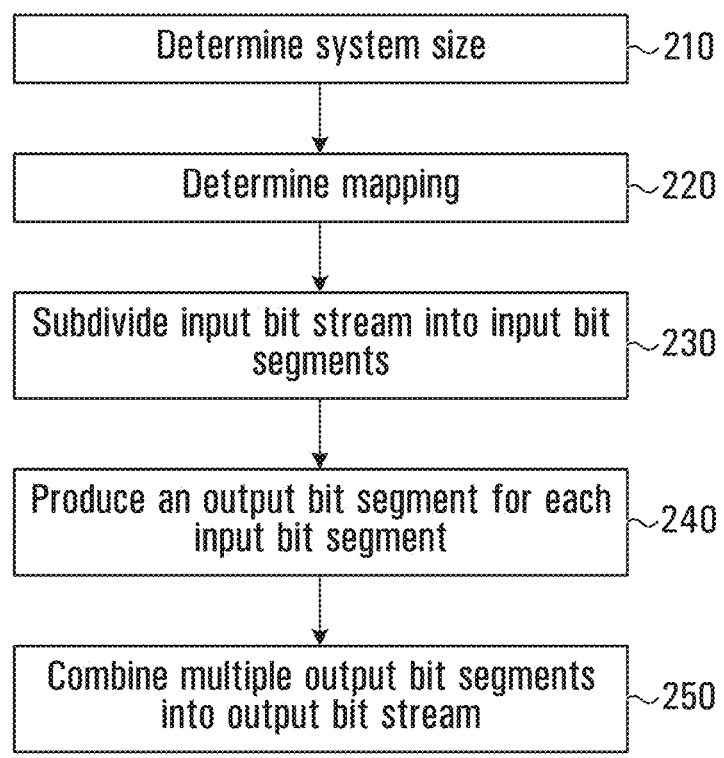
FIG. 2 is a flowchart showing steps in a data encoding process, in accordance with a non-limiting embodiment.

A non-limiting embodiment of the data encoding process that may be implemented by the processing entity 112 of the sending device 110 in certain non-limiting embodiments will now be described with further reference to the flowchart in FIG. 2 and the conceptual block diagram in FIG. 3, for a received/obtained input bit stream 310.

At step 210 of the data encoding process, which may be caused by execution of the computer-readable instructions 116, the processing entity 112 determines a system size. This system size is denoted N and may be stored as a constant or variable in the memory 114. N is an integer at least as great as 1 and typically would be higher for added security. For example, in some embodiments, N may be at least as great as 10, while in other embodiments, N may be at least as great as 20. In specific example embodiments, which are non-limiting, N may be 12, 13 or 14. There is no particular limitation on the magnitude of N, although it can be expected that greater security will be achieved with a higher value of N. Also, the system size may be fixed, or may be dynamically changed over time as will be described later on.

At step 220 of the data encoding process, which may be caused by execution of the computer-readable instructions 116, the processing entity 112 obtains data indicative of a one-to-one mapping between $2^N$ possible input indexes and $2^N$ possible output indexes where, it is recalled, N represents the system size. To disambiguate this mapping from other mappings described elsewhere, the mapping obtained at step 220 will be referred to herein as the "encoding mapping".

The encoding mapping may take on multiple forms in different embodiments. For example, the encoding mapping may take the form of $\{P(x,y)\}$, which is a set of values at coordinates $P(x,y)$ that can be stored in the memory 114, wherein for each x (between 0 and $2^N-1$) there is a single y (also between 0 and $2^N-1$) such that $P(x,y)=1$, and wherein for each y there is a single x such that $P(x,y)=1$, and wherein $P(x,y)=0$ for all other combinations of x and y. The encoding mapping may thus represent a one-to-one association between each of the values from 0 to $2^N$-1 and another (typically but not necessarily) different value between 0 and $2^N$-1.

In another example, the encoding mapping take the form of a $2^N$-by-$2^N$ matrix "P", where each row and each column contains a single "1", and the rest of the matrix elements (of which there are $2^{2N}$-$2^N$)) are "0". Such a matrix may be referred to as a "binary permutation matrix", and may be stored in the memory 114.

In yet another example, the encoding mapping may take the form of a switch fabric input-output correspondence table that associates each of $2^N$ switch inputs to one of $2^N$ switch outputs. The switch fabric input-output correspondence table may be stored in the memory 114. Other ways of representing the encoding mapping, such that it may be stored in the memory 114 and suitably accessed and interpreted by the processing entity 112, are within the scope of the present invention. As with the system size (N), the encoding mapping may be fixed, or may be dynamically changed over time as will be described later on.

Figure 3:
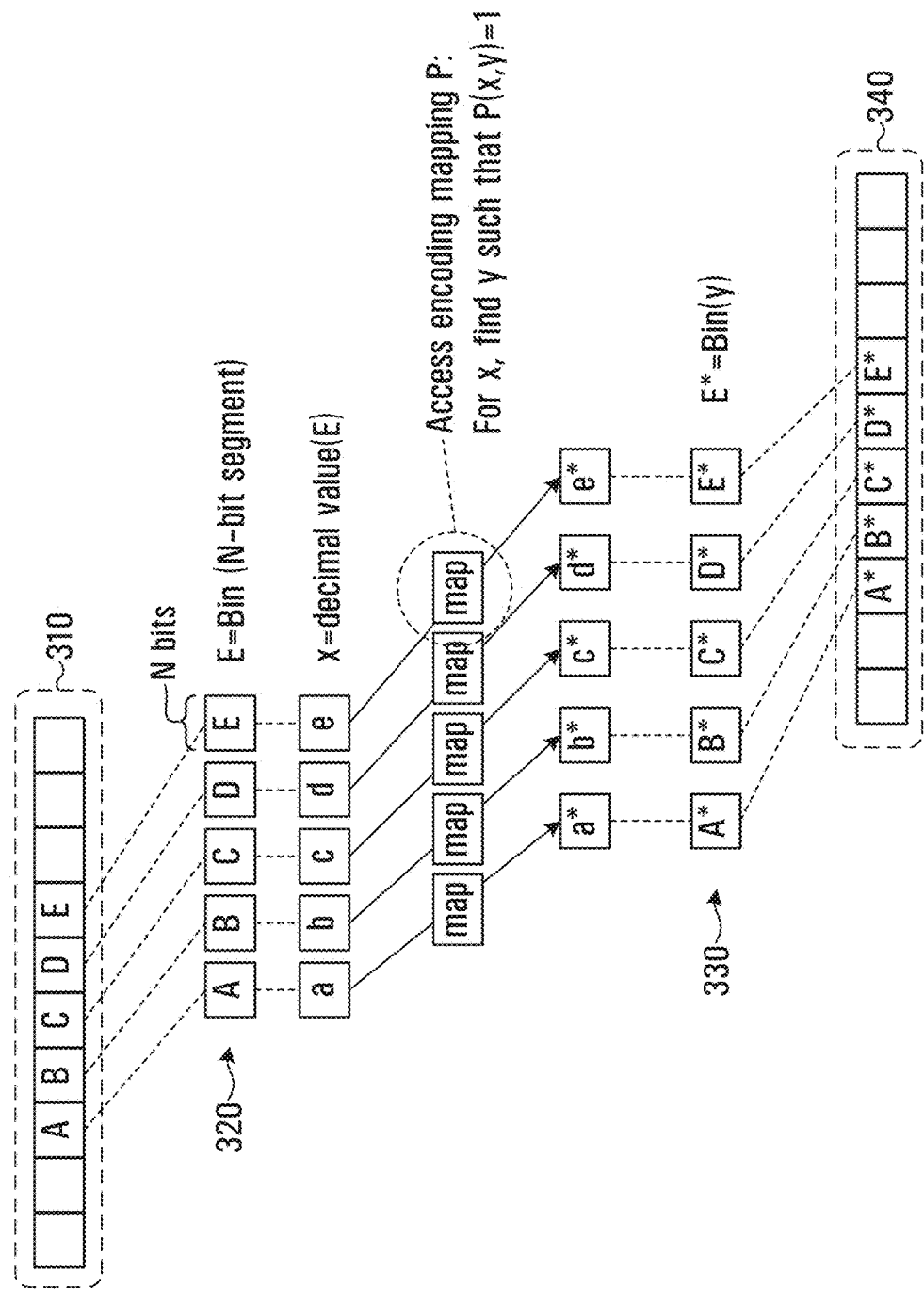
FIG. 3 is a conceptual block diagram, showing various steps in the data encoding process, in accordance with a non-limiting embodiment.

At step 230 of the data encoding process, which may be caused by execution of the computer-readable instructions 116, the processing entity 112 subdivides or separates the input bit stream 310 in FIG. 3 into a plurality of input bit segments 320 in FIG. 3, such that each of the input bit segments 320 is configured to have the system size, i.e., each of the input bit segments 320 is N bits long. It is noted that whereas a customary way to separate binary data is in groups of 8 bits (i.e., bytes), the value of N need not be 8 or a multiple thereof, and therefore the input bit segments 320 resulting from execution of step 230 are not necessarily a multiple of 8 bits long.

At step 240 of the data encoding process, which may be caused by execution of the computer-readable instructions 116, the processing entity 112 produces a plurality of output bit segments 330, where each of the output bit segments 330 corresponds to a respective one of the input bit segments 320. Each of the output bit segments 330 is configured to have the system size and is therefore N bits long, i.e., just like the input bit segments 320. Moreover, the contents of a given one of the output bit segments 330 is related to the contents of the respective one of the input bit segments 320 by the encoding mapping as will be described herein below. Specifically, for a particular N-bit input bit segment, an input index is determined as the (decimal) value of the particular N-bit input bit segment. Then, an output index is determined based on the input index and the encoding mapping. Finally, the corresponding N-bit output segment is set to the binary representation of this output index.

There are various ways to determine an output index based on an input index and the encoding mapping in a practical implementation. In one example, with reference to FIG. 4A, if one considers that the encoding mapping is represented by the set {P(x,y)}, a look-up table 402 may store the various combinations of x and y that give P(x,y)=1. The look-up table 402 could be stored in the memory 114, wherein each of $2^N$ input indexes (the "x" column) is associated with a single output index (the "y" column). Thus, step 240 can involve accessing the look-up table 402 in the memory 114, based on an input index derived as the value of a particular N-bit input bit segment, so as to obtain an output index.

In another example, with reference to FIG. 4B, if one considers that the encoding mapping is represented by a $2^N$-by-$2^N$ binary permutation matrix P stored in the memory 114 (in this example, N=3), and if one creates a vector "g" as the $1\times2^N$ (i.e., $1\times8$) vector that contains a "1" element in the column that represents the input index, i.e., the (decimal) value of a particular N-bit input bit segment, then step 240 can involve calling a subroutine that executes a vector-matrix multiplication between g and P. The subroutine may be stored as computer-readable instructions stored in the memory 114 and executable by the processing entity 112. The outcome of the vector-matrix multiplication will be a $1\times2^N$ (i.e., $1\times8$) vector "g*" that contains a "1" element in the column that represents the output index.

Figure 4C:
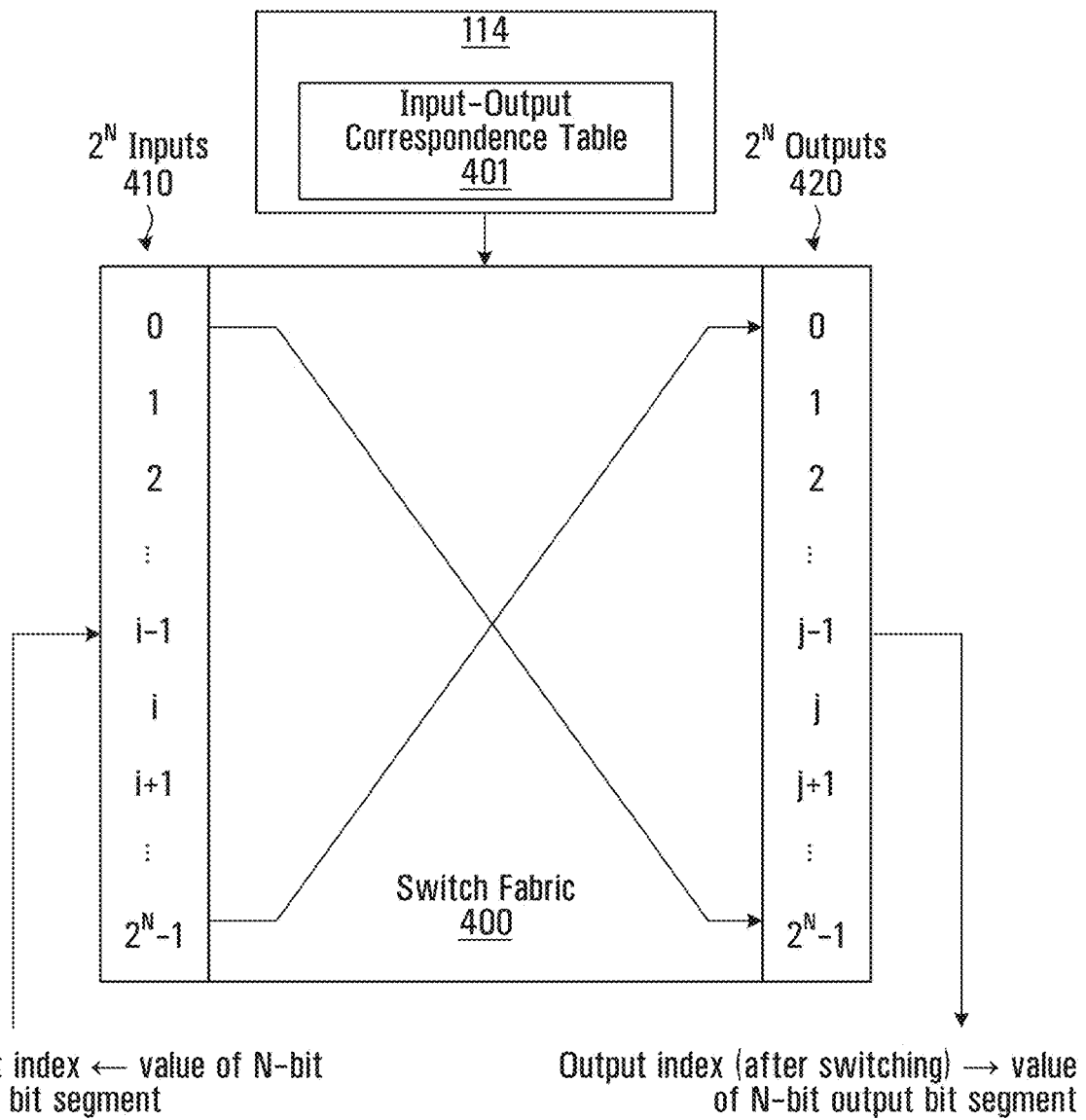

In yet another example, with reference to FIG. 4C, a hardware or software switch fabric 400 having $2^N$ inputs 410 and $2^N$ outputs 420 may be implemented within the sending device 110 and the encoding mapping may be represented as a switch fabric input-output correspondence table 401 for the switch fabric 400, as may be stored in the memory 114. The inputs 410 correspond to bit positions in successive $2^N\times1$ input arrays (each containing only one "1" element at the position of the input index, the rest being zeroes) formed from corresponding N-bit input bit segments 320. The result is a succession of $2^N\times1$ output arrays at the outputs 420 of the switch fabric 400. Each such output array contains only one "1" element at the position of the output index, the rest being zeroes. The decimal value of the position of the output index is converted into binary form, thus yielding the corresponding one of the N-bit output bit segments 330.

The foregoing is repeated for multiple ones of the input bit segments 320 and it will be appreciated that the manipulations and calculations can be achieved highly efficiently using a computer, notably by the processing entity 112.

At step 250 of the data encoding process, which may be caused by execution of the computer-readable instructions 116, the processing entity 112 may concatenate or combine multiple (e.g., successive) ones of the output bit segments 330 into an output bit stream 340, which may itself then be organized into bytes (or any other convenient grouping) and sent out onto the channel 130, e.g., they may be carried by the signal 140 after modulation into a modulated signal. The term "modulated signal" may include a signal that has one or more of its characteristics set or changed in such a manner as to encode information in the signal.

Of course, additional encoding and encryption of the input bit stream 310 (i.e., prior to execution of the data encoding process) and/or the output bit stream 340 (i.e., after execution of the data encoding process) could be added to render overall data encoding procedure even more secure.

Figure 5:
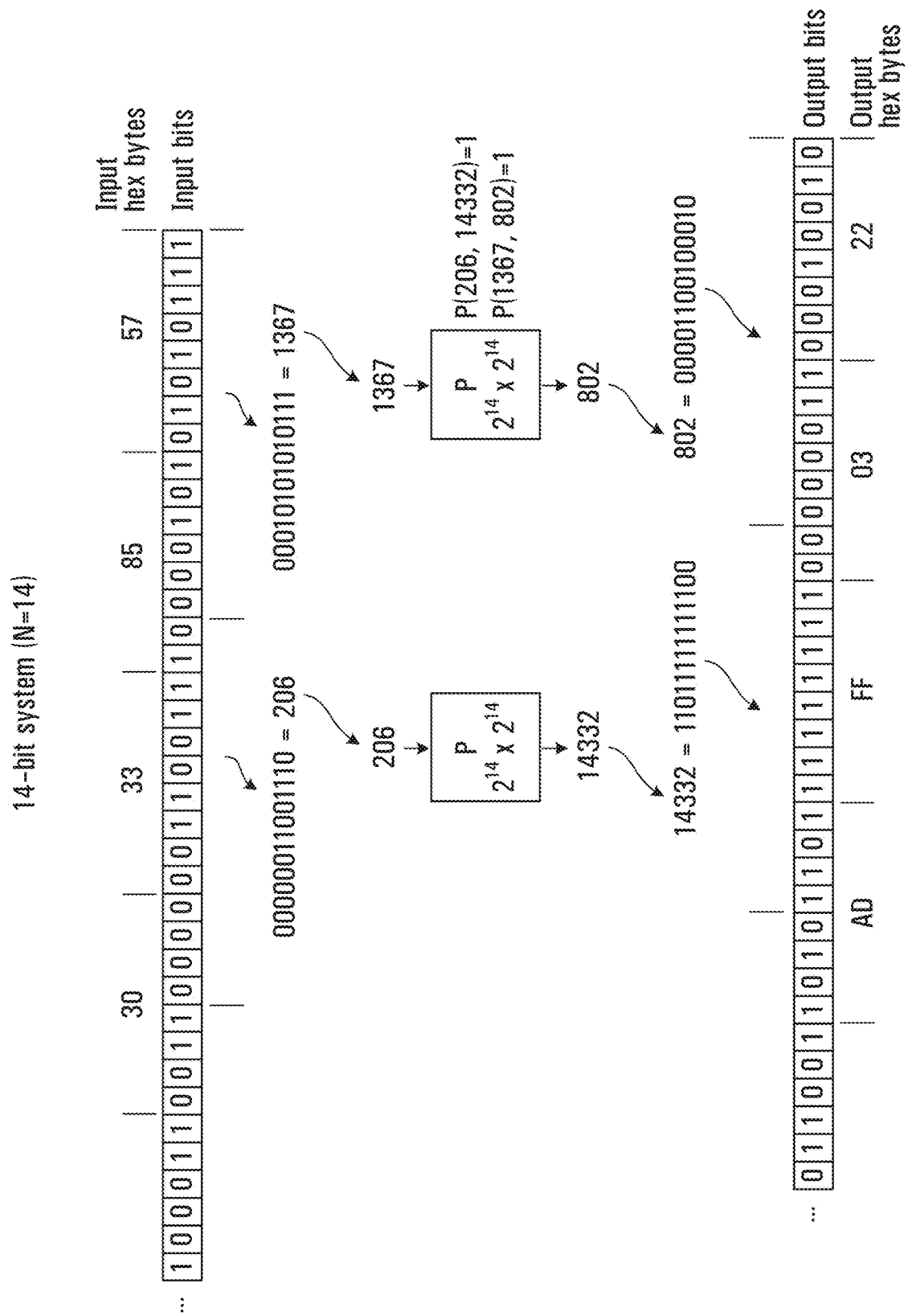
FIG. 5 is a block diagram, showing various steps in the data encoding process, in the context of a specific example of a non-limiting embodiment.

A specific non-limiting example of the data encoding process is now described with reference to FIG. 5. It is seen that an input data stream includes a sequence of hex bytes whose values are, from right to left, 57, 85, 33, 30, etc. The hex bytes can be broken down into bits, thus creating an input bit stream. The input bit stream is then broken down into segments of size N, where in this example, N=14. The first 14-bit input bit segment is 00010101010111, which has a decimal value of 1367, the next 14-bit input bit segment is 00000011001110, which has a decimal value of 206, and so on. The encoding mapping is first applied to decimal value 1367. In this case, the encoding mapping is represented by a the set {P(x,y)}, where P(x,y)=1 for any x between 0 and $2^{14}$-1 (=16383), but for only one value of y for each such x; in all other cases P(x,y)=0; and mutatis mutandis for y and x. In this particular example, the relevant value of x is 1367, and it is noted that P(1367,y)=0 for all values of y except one. Let such value of y be 802. Thus, P(1367,802)=1. Then, 802 is converted into a 14-bit binary value, which works out to 00001100100010.

It is seen that the input bit segment had seven "1"s and the output bit segment only has four "1"s. This shows that the encoding mapping does not merely represent a permutation of the bits in the input bit segment. In fact, a given density of "1"s in the input bit segment may produce any given density of "1"s in the corresponding output bit segment, depending on the specifics of the encoding mapping.

Next, the encoding mapping is applied to decimal value 206. Let P(206,y)=0 for all values of y except 14332. Thus, the value of 14332 is obtained as the "column" index for "row" index 206. Then, the decimal value 14332 is converted into a 14-bit binary value, which amounts to 11011111111100. It is seen that there is again a difference in the density of the "1"s in the input bit segment and in the output bit segment. The bits in the output bit segments may then be concatenated in various ways and grouped again in, say, hex bytes, in this case yielding, from right to left, 22, 03, FF, AD.

The change in the bit pattern between a particular N-bit input bit segment and the corresponding N-bit output bit segment can be manifested, in a computer system, as a difference in voltage, current or other physical characteristics of the signal used to store and/or transmit the bit pattern in question.

In a still further example, with the $2^N$-by-$2^N$ mapping is stored in the memory, an ordered set of input bits is obtained. The processing entity 112 breaks down the ordered set of input bits into a plurality of N-bit input segments. Then, N-bit output segments corresponding to respective ones of the N-bit input segments are produced by: (i) expanding each of the N-bit input segments into a $2^N$-bit input segment, applying the $2^N$-by-$2^N$ mapping to the $2^N$-bit input segment to determine a $2^N$-bit output segment, compressing the $2^N$-bit output segment into an N-bit output segment. Then an ordered set of output bits is formed using the resulting N-bit output segments and the ordered set of output bits can be released onto a physical medium or stored in the memory.

Data Decoding Process

The signal 140 travels along the channel 130 and reaches the receiving device 120. Certain pre-processing may be required to account for channel loss, distortion and other factors. Ultimately, however, the receiving device 120 executes a data decoding process that is virtually identical to the data encoding process performed by the sending device 110, except that it is performed with a decoding mapping rather than with an encoding mapping. The decoding mapping is the inverse of the encoding mapping so as to recover the originally encoded data.

Thus, for example, where the encoding mapping is represented by $\{P(x,y)\}$, the decoding mapping may be represented by $\{Q(x,y)\}=\{P^{-1}(x,y)\}=\{P(y,x)\}$.

Alternatively, if the encoding mapping applied during the data encoding process is represented by a binary permutation matrix P, the decoding mapping to be applied during the data decoding process may be represented by $Q=P^T$ (the transpose of P). It is noted that due to the structure of P being a binary permutation matrix, $P^T \times P=I$. In other words, if the N-bit input bit segment to the data encoding process was an "unencoded bit segment" (with the N-bit output bit segment resulting from application of P to the unencoded bit segment being an "encoded bit segment"), and if the N-bit input bit segment to the data decoding process is the encoded bit segment, and furthermore if the binary permutation matrix Q applied by the data decoding process is the transpose of P, then the N-bit output bit segment resulting from the data decoding process will be the original, unencoded bit segment. That is, the original N-bit input but segments are recovered after the decoding process.

Due to the relationship between P and Q (i.e., $Q=P^T$), it follows that Q could be used in the data encoding process and P could be used in the data decoding process, since $Q^T=P$. Thus, overall, the encoding and decoding mappings may be represented as a pair of symmetric permutation matrixes P, Q, each being the transpose of the other, one of which is used in encoding and the other of which is used in decoding. Alternatively, the encoding and decoding mappings may be expressed as a single binary permutation matrix B together with additional an indicator (or "flag") being provided to the sending device 110 and the receiving device 120 to instruct one of the two devices to use B and the other to use $B^T$.

It is seen that both the data encoding and decoding processes do not significantly add to the computational burden of the processing entities 112, 122 in the sending and receiving devices 110, 120. This is due to the fact that the data encoding and decoding processes involve operations such as (i) index mapping from input index to output index or (ii) sparse vector-matrix multiplication, either of which may efficiently handled by modern computer systems and processing entities. As such, CPU usage and energy costs of encoding and decoding may be kept low, potentially resulting in longer battery life, less latency and freeing up processing resources for other tasks. This contrasts with more complex numerical methods such as prime number factorization.

It should also be appreciated that for an N-bit system size, the size of the mapping (e.g., permutation matrix or switch fabric input-output correspondence table or look-up table) is $2^N$ by $2^N$. This means that, in the case of a binary permutation matrix, there are $(2^N)! (=2^{N*}((2^N)-1)*((2^N)-2)* \ldots *3*2*1)$ different possible permutation matrices, yet only one of them represents the encoding mapping being used by the sending device 110 at any given time. As such, even in just a 12-bit system, a malicious third party would need to guess, for each 12-bit segment, which of $2^{12}$ factorial $((2^{12})! >$ over 1E+13019) possible permutation matrices was used, assuming that the malicious party knows it is a 12-bit system to begin with. This may be considered a computationally intractable problem for many of today's systems, and has the potential to dissuade malicious parties from trying to "hack" the system. As such, while each possible $2^N$ input bit stream does indeed map deterministically to a single $2^N$ output bit stream, this mapping does not arise from mere permutation of the bits in the input bit stream; rather it results from selection of an encoding mapping in a much larger space (i.e., the selection of one $2^N \times 2^N$ matrix in the space of $2^N \times 2^N$ matrices), which makes it more economical for a hacker to "guess" the N-bit value of the original input bit segment corresponding to an observed N-bit output bit segment, than to try to find the "correct" encoding mapping over an observation period. Since "guessing" by an outside party cannot be prevented even in a maximally secure system, one can conclude that by reducing a hacker's effect to guessing, the level of data protection provided by the presently described embodiments is practically equivalent to the level of data protection provided by a maximally secure system.

Thus, by combining low computational complexity and enhanced security against intrusion/hacking, certain embodiments described herein may help achieve secure high-bandwidth, real-time communications.

Agreement on Encoding/Decoding Mapping Between Sending and Receiving Devices

The sending device 110 must know the encoding mapping and the receiving device 120 must know the decoding mapping, which is the inverse of the encoding mapping.

In the case of the encoding mapping being represented by a binary permutation matrix P, the permutation matrix P is used by the sending device 110 and the transpose of this matrix, namely $P^T$, is used by the receiving device 120. However, since $P^T$ is derivable from P, it is possible for both devices to be advised of just the permutation matrix P as well as to be advised of a flag (or other indicator) that tells the sending device 110 to use P in its data encoding process (i.e., without transposing it), and that tells the receiving device 120 to use $P^T$ in its data decoding process. Of course, the reverse is also possible (i.e., using $P^T$ in the data encoding process and P in the data decoding process).

In the case of the encoding mapping being represented by a set $\{P(x,y)\}$, the sending device 110 uses $\{P(x,y)\}$ and the receiving device 120 uses $\{P^{-1}(x,y)\}$. Again, since=$\{P^{-1}(x,y)\}$ is derivable from $\{P(x,y)\}$ (as it equals to $\{P(y,x)\}$), it is possible for both devices to be advised of just the set $\{P(x,y)\}$ as well as to be advised of a flag (or other indicator) that tells the sending device 110 to use $\{P(x,y)\}$ in its data encoding process, and that tells the receiving device 120 to use $\{P(y,x)\}$ in its data decoding process. Of course, the reverse is also possible (i.e., using $\{P(y,x)\}$ in the data encoding process and $\{P(x,y)\}$ in the data decoding process).

The following embodiments describe various ways of informing the sending device 110 and the receiving device 120 of the appropriate encoding or decoding mapping to use. For the sake of simplicity, the encoding mapping is represented by a binary permutation matrix P and the decoding mapping is represented by a binary permutation matrix $P^T$; however, lookup tables or the previously described sets $\{P(x,y), \{P(y,x)\}\}$ could also have been used. Also, in each of the below embodiments, rather than transmitting the specific matrix (P or $P^T$) to be used by a particular recipient of the transmission, it is possible to include a common permutation matrix (P) in the transmission along with a flag or other indicator that specifies whether the intent is to transmit P or $P^T$ to the recipient.

Figure 6A:
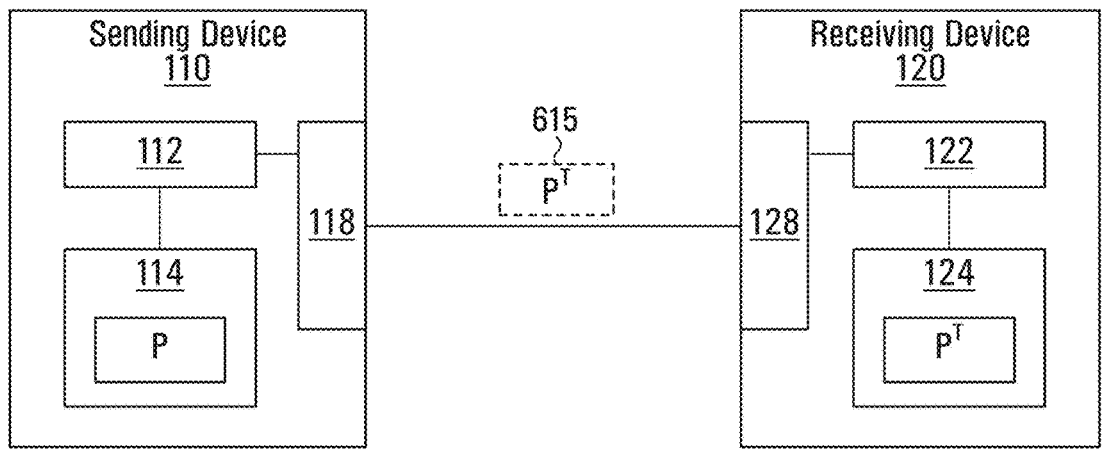
FIGS. 6A-6D are block diagrams showing distribution of the encoding and decoding mappings to the sending and receiving devices, respectively, in accordance with various non-limiting embodiments.

In one embodiment, shown in FIG. 6A, the sending device 110 generates the encoding mapping P and stores it in the memory 114. The sending device may send $P^T$ to the receiving device 120 in a signal 615 during an initialization phase. To this end, a handshaking protocol may be executed by the sending device 110 and the receiving device 120. This handshaking protocol may be securely implemented using current encryption technologies such as AES or DES. Alternatively, the handshaking protocol may be securely implemented using the techniques taught herein with a pre-defined system size M and default encoding (and decoding) mapping that is known and/or made available to the sending device 110 and the receiving device 120. For example, where M=3, the sending device 110 may use an 8×8 binary permutation matrix R for the purposes of encoding data that carries $P^T$, and the receiving device may use $R^T$ in its data decoding process for the purposes of recovering $P^T$ from the data encoded using R.

Thus, one embodiment of a data protection method could include encrypting the data indicative of the default mapping prior to sending it to the receiving device, e.g., using a private key of a private key/public key pair, where the private key being uniquely known to the sending device, and where the public key is known by or made available to the receiving device.

Figure 6B:
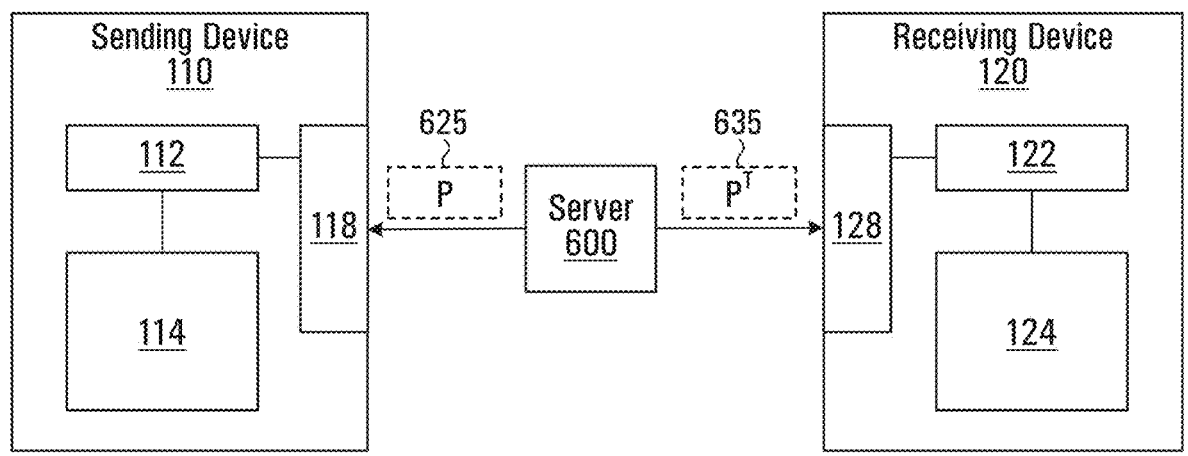

In another embodiment, shown in FIG. 6B, a central server 600 may securely communicate with the sending device 110 and/or the receiving device 120 in order to distribute the permutation matrix P during an initialization phase in signals 625 and 635. This secure communication may be implemented using current encryption technologies such as AES or DES, because it only requires the transmission of enough data to define a $2^N$-by-$2^N$ permutation matrix. Alternatively, the server 600 may communicate with each of the sending device 110 and the receiving device using the techniques taught herein with a pre-defined system size M and default encoding (and decoding) mapping that is a shared secret between the server 600 and the sending device 110, and between the server 600 and the receiving device 120 (it is noted that different shared secrets may be used by the server 600 when communicating with the sending device 100 and the receiving device 120 during the initialization phase). The central server 600 is equipped with a processor connected to a memory and an I/O, wherein the processor executes computer-readable instructions stored in the memory in order to perform the above specified functions.

Figure 6C:
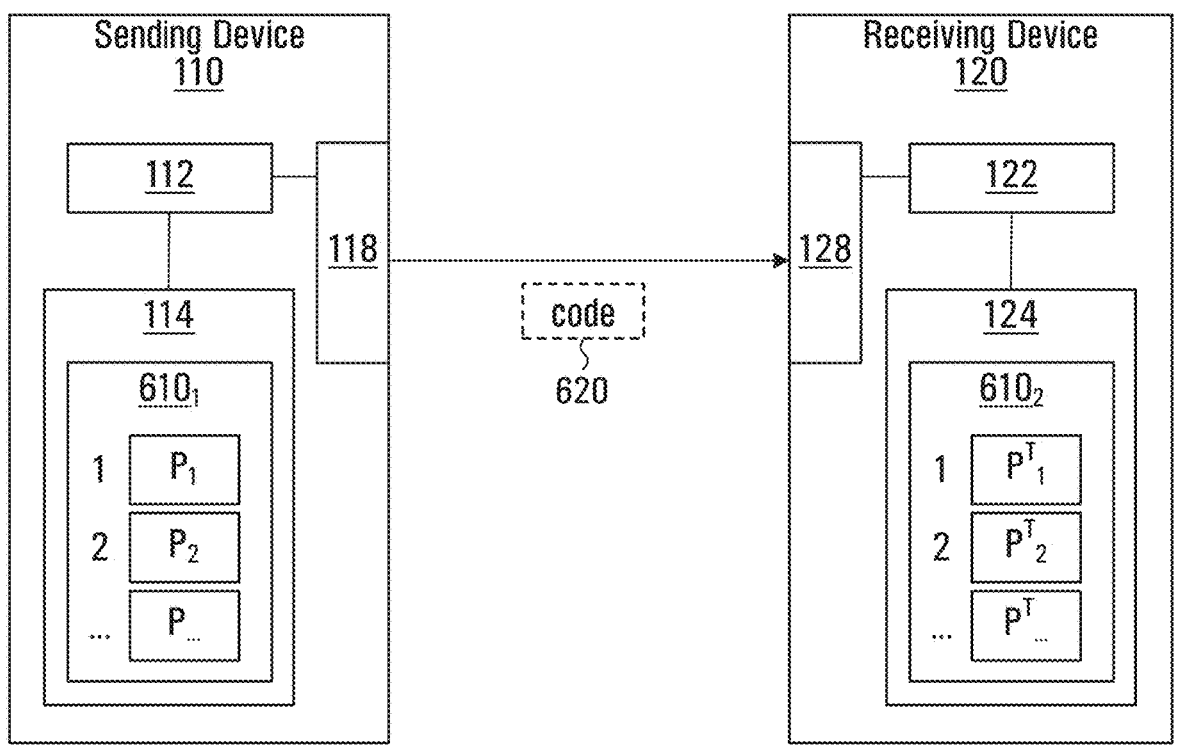

In another embodiment, shown in FIG. 6C, the sending device 110 and the receiving device 120 may each store a respective table 610 of pre-determined permutation matrices ($P_1$, $P_2$, . . . in the case of the sending device 110 and $P^T_1$, $P^T_2$, . . . in the case of the receiving device 120) that is securely installed in the respective memory 114, 124, with each permutation matrix in the table being referred to by a unique code (1, 2, . . . ). Thus, when the sending device 110 is using a particular permutation matrix in its data encoding process, rather than send the corresponding permutation matrix transpose to the receiving device 120, the sending device 110 may send a message 620 specifying the code corresponding to that permutation matrix in the table $610_2$ stored in the memory 124 at the receiving device 120. This allows the transmission between the sending device 110 and the receiving device 120 to be unencrypted (i.e., plaintext) because the code corresponding to one of the permutation matrices in the memory 124 is meaningless to an outside observer that does not have the table $610_2$. This embodiment only requires the tables $610_1$ and $610_2$ to be securely populated beforehand.

As an extension of the above embodiments, the sending device 110 and/or the receiving device 120 may choose to change the permutation matrix, or may be prompted to do so by an external party (e.g., a user, a central server). This can result the transmission of a new permutation matrix (appropriately protected or encrypted), or of a code corresponding to a new permutation matrix (which could be sent in plaintext). Alternatively, the order in which the permutation matrix changes can be programmed such that the mere request for a change in the permutation matrix may prompt the sending device 110 and the receiving device 120 to navigate ("hop") through its respective table $610_1$, $610_2$ of permutation matrices in a predefined way. Furthermore, there is no need for a subsequent permutation matrix to have the same system size. The system size may be specified as an independent variable, and there may be different levels of sophistication, such as different tables of permutation matrixes for different system sizes, such that a code may be valid when received for different system sizes but would refer to different permutation matrixes of different sizes, but known/made available to both parties due to their prior storage in the table of permutation matrixes.

After initial sharing the permutation between the sending device and receiving device, both sides can agree to form a session permutation matrix by using the encoding/decoding mechanism described in this document. Using the newly formed permutation matrix for a session data transmission can improve the data transmission security.

A change in session permutation matrix (which may involve a new system size) may be triggered by providing an indication to the sending device 110 and/or the receiving device 120. The indication may indicate a separation between N-bit input segments (and/or N-bit output segments) to be processed using the previous (old) permutation matrix and the N-bit input segments (and/or N-bit output segments) to be processed using the new permutation matrix. In one embodiment, the indication may specify the number of bits (or segments) to which a first permutation matrix applies before a change of permutation matrix (which may involve a new system size) is required. In another embodiment, the indication may signal an instantaneous change to a new system size or permutation matrix. In yet another embodiment, the indication may signal a time at which the sending device or the receiving device is to switch over to a new system size or permutation matrix. Also, the indication may provide a set of conditions which, when met, trigger a change in the permutation matrix, with the understanding that such conditions are being monitored by the sending and/or receiving devices 110, 120. An example of a condition is elapsed time, absolute time (e.g., change of day), number of bits processed, a detected hacking attempt, an interaction with a user through the I/O, etc. The indication may be controlled by the sending device 110 and transmitted from the sending device 110 to the receiving device 120, or it may be controlled by a server (e.g., central server 600) and send to both the sending device 110 and the receiving device 120. The indications may be encoded into a physical signal.

Figure 6D:
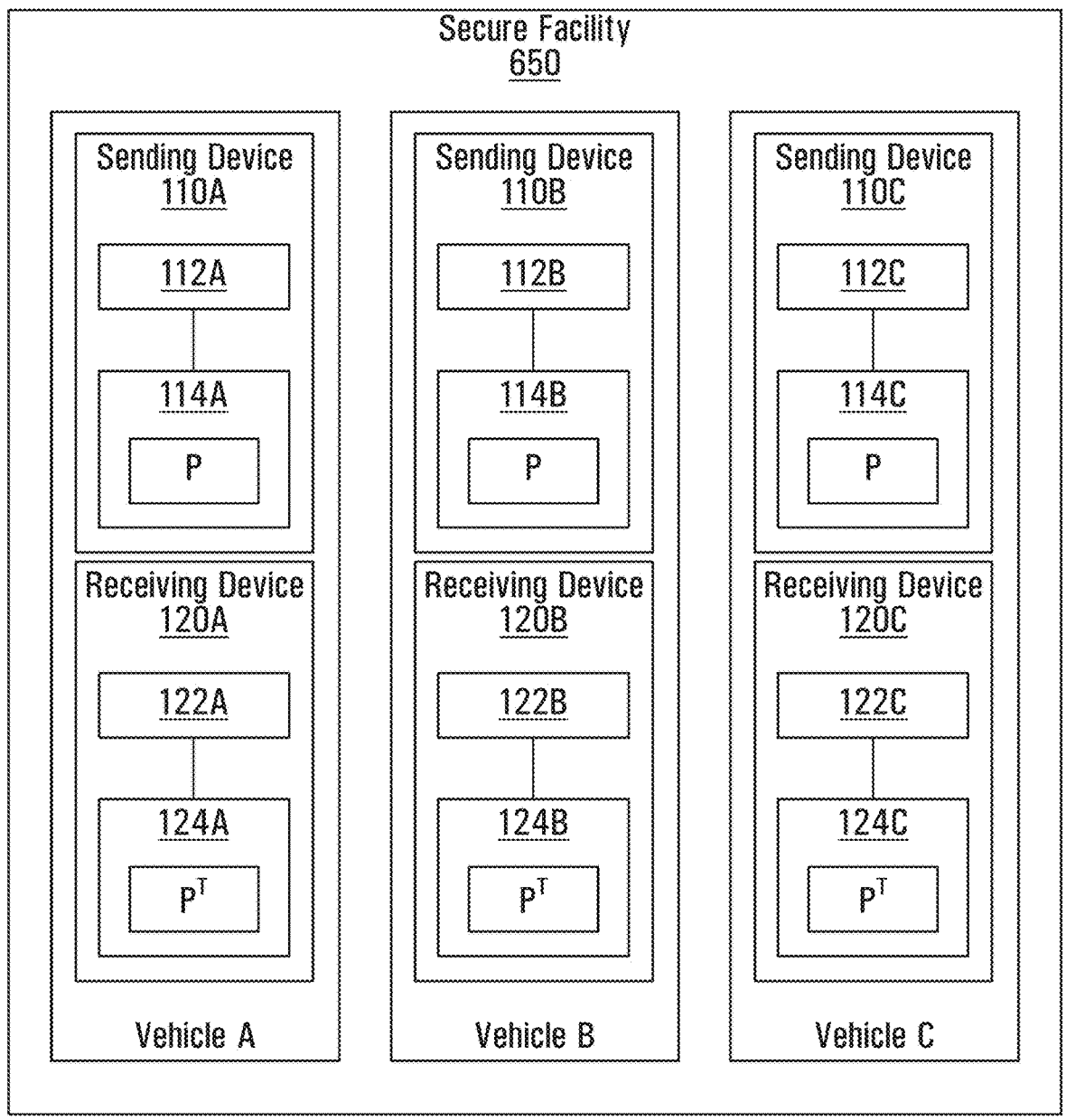

In another embodiment, shown in FIG. 6D, all sending devices and receiving devices that are susceptible of communicating with one another are produced in the same secure facility 650. Consider for example devices such as vehicles, satellites and smartphones that are produced in a secure plant. The vehicles, satellites, or smartphones (here illustrated as Vehicle A, Vehicle B and Vehicle C in a non-limiting example) can thus be provided with sending devices (110A, 110B, 110C, respectively) embedded with the same encoding mapping P and with receiving devices (120A, 120B, 120C, respective) embedded with the same decoding mapping $P^T$. In this way, Vehicle A, Vehicle B and Vehicle C can communicate amongst themselves (and/or with a central server at the secure facility 650 that is also aware of P and $P^T$), and this communication remains secure once Vehicle A, Vehicle B and Vehicle C have left the plant 650 and entered the marketplace. There is no need for any particular vehicle, satellite, or smartphone to perform handshaking, and there is no need for an initialization phase. Even in the case of a 12-bit system, the difficulty of hacking such a system is so extreme (as there are $2^{12}$ factorial (($2^{12}$)!>1E+13019) possible permutation matrices) that it is envisaged that a single encoding mapping would provide adequate data protection throughout the life of the vehicles, satellites, or smartphones. The mapping may therefore be securely embedded in the memory of each of the devices in such a way that it prevents any external access or tampering.

Other Examples of Use Cases

A non-limiting example use case of the present technology is to enable of secure communication over the internet (e.g., amongst smartphones, automatic teller machines, corporate servers, data centers, satellites, e-commerce servers, vehicles, IoT devices including home appliances, etc.). Embodiments of the invention can be applied to any layer of communication, such as any layer of the OSI (open systems interconnect) reference model because it deals with primitive data N-bit segments. For example, if implemented in the physical layer, the two physically connected end devices share the encoding mapping before sending. The near end device takes an input bit stream and applies the encoding mapping (e.g., permutation matrix P) to N-bit segments to produce an output bit stream of N-bit segments, finally modulating the output bit stream before sending it to the far end device over the channel 130; and upon receipt, the far end device performs the decoding process by applying the decoding mapping (e.g., permutation matrix $P^T$) to obtain back the original bit stream. This physical layer implementation can be applied to long haul/metro point-to-point transmissions for highly secure data communications.

If implemented in the application layer, then the encoding process may be executed by a sending application and the decoding process may be executed in a receiving application. The sending application may share the permutation matrix P with the receiving application, and when the sending application plans to send data, it performs the permutation switching with the given bit block size N and then the output bit segments will be converted into a regular bit stream or byte stream to send; at the receiving application, it will apply permutation switching with $P^T$ to bring back the original data. In this implementation, there is no need to change any existing information infrastructure, it functions just like plug-N-play.

Embodiments of the invention can be also implemented as software-only such as in applications directly, or a software-embedded system such as inside a network protocol stack, to be enable and disable, as well as browser adds-on, etc. Certain embodiments can also be implemented in data communication devices such as network nodes, routers/wireless, wireless base stations. As well, certain embodiments can be implemented into smart phone transmission/receiving units, or mobile applications. Data security for internet information communications may thus be improved.

Further implementations include vehicle-to-vehicle (V2V) communications for smart driving to provide highly secure communications between vehicles.

Certain embodiments invention can be used to build a secure shade for cloud data storage by providing an integrated encoding and decoding device in the front of cloud data storage devices. All data would be encoded by the device using pre-selected permutation matrix P before sending to storage devices and decoded by the device using the same permutation matrix $P^T$ before sending out of the cloud.

Other non-limiting examples of use cases of the present technology may be to:
Enable secure communication between autonomous vehicles and a central server.
Enable secure communication between satellites and a ground station.
Enable secure communication amongst vehicles on the road (V2V private network).
Enable secure data storage.

A further non-limiting example use case pertains to an individualized operating system (OS) obtained by embedding a permutation switching sublayer into the OS to enhance data security and prevent data breaches. The permutation switching sublayer utilizes a permutation switching matrix as described above. The permutation switching matrix can be automatically determined by each individual system, based on system identifiers. In doing so, malicious software cannot be run in such an individualized system.

Figure 7A:
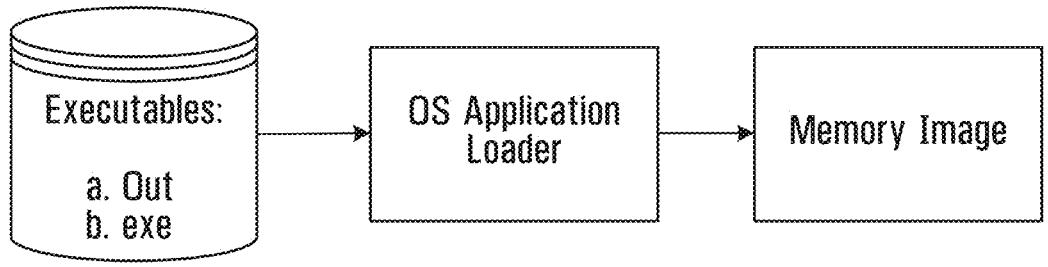
FIG. 7A-7C illustrate how certain embodiments may be applied to an application loading scenario for an operating system (OS).

FIG. 7A illustrates a typical process for an OS to load an application into memory then run it. In this case, malware might execute in a computing system if the malware is in the system; this type of occurrence gives the malware a "write once and run everywhere" attribute which can create huge damage to users.

Figure 7B:
Figure 7C:
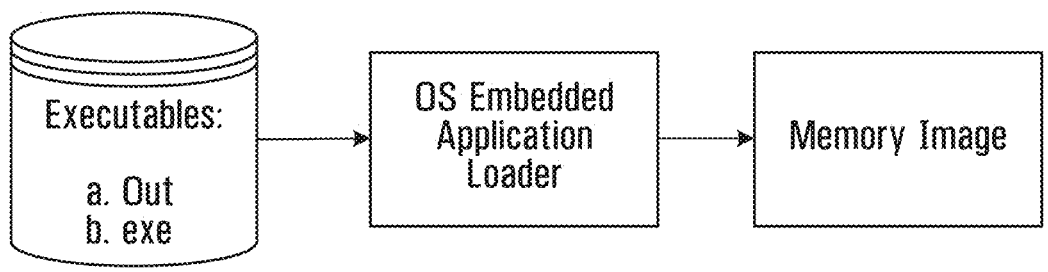

In contrast, an individualized OS consists of the typical OS with embedded application localizer (FIG. 7B) and embedded application loader (FIG. 7C). The typical OS generate the installed system permutation matrix based on the OS license and the hardware system characteristics, securely stored into its system or re-produced at run-time it every time when the system starts. A user application must be "localized", with the user authorization, by the embedded application localizer with a permutation switching (using the system permutation matrix P) to application executables and generating localization IDs stored into the localized application images.

Only an application that has been localized (see FIG. 7C) can be loaded and applied the permutation switching with the system permutation matrix $P^T$ to bring back to original executable to be loaded to memory to run. At the same time, the localization can be verified for correctness.

It will be appreciated that automatic downloaded malware will be prevented from executing in an individualized OS system.

Various operational embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order-dependent. Alternative ordering will be appreciated by one skilled in the art having the benefit of this description. Further, it will be understood that not all operations are necessarily present in each embodiment provided herein.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application.

What is claimed is:

1. A communication system, comprising:
a first apparatus comprising a first processing entity coupled to a first memory; and
a second apparatus comprising a second processing entity coupled to a second memory;
wherein the first and second apparatuses communicate over a communication channel;
wherein the first memory stores first computer-readable instructions and a first mapping between $2^N$ possible input indexes and $2^N$ possible output indexes, N being an integer greater than one;
wherein the second memory stores second computer-readable instructions and a second mapping between $2^N$ possible input indexes and $2^N$ possible output indexes, the second mapping being derivable from the first mapping;
wherein the first processing entity is configured for:
obtaining a first bit stream;
subdividing the first bit stream into a plurality of N-bit first input segments;
for each of the N-bit first input segments, determining a first input index as a value represented by the N bits of a particular one of the N-bit first input segments, determining a first output index based on the first input index and the first mapping, and setting bits of a corresponding N-bit first output segment so as to represent the value of the first output index; and
causing a second bit stream formed using each corresponding N-bit first output segment to be transmitted over the communication channel;
wherein the second processing entity is configured for:
receiving the second bit stream;
subdividing the second bit stream into a plurality of N-bit second input segments;
for each of the N-bit second input segments, determining a second input index as a value represented by the N bits of a particular one of the N-bit second input segments, determining a second output index based on the second input index and the second mapping, and setting bits of a corresponding N-bit second output segment so as to represent the value of the second output index so as to recover a corresponding one of the N-bit input segments; and
outputting a third bit stream formed using each corresponding N-bit second output segment.

2. The communication system defined in claim 1, wherein the first processing entity is further configured to send the second mapping to the second apparatus for storage in the second memory.

3. The communication system defined in claim 2, wherein the first processing entity is further configured to derive the second mapping from the first mapping.

4. The communication system defined in claim 3, wherein when the first mapping is represented as a first matrix and the second mapping is represented as a second matrix, the first and second matrices being transposes of one another.

5. The communication system defined in claim 1, wherein the first processing entity is further configured to send a transmitted mapping to the second apparatus, the transmitted mapping being the first mapping or the second mapping.

6. The communication system defined in claim 5, wherein the first processing entity is further configured to send a flag to the second apparatus, the flag indicating whether the transmitted mapping is the first mapping or a transpose of the first mapping.

7. The communication system defined in claim 6, wherein the second processing entity is further configured to process the flag and to store in the second memory the transmitted mapping when the flag indicates that the transmitted mapping is the transpose of the first mapping.

8. The communication system defined in claim 6, wherein the second processing entity is further configured to process the flag and to store in the second memory a transpose of the transmitted mapping when the flag indicates that the transmitted mapping is the first mapping.

9. The communication system defined in claim 5, wherein the first processing entity is further configured for encrypting data indicative of the transmitted mapping prior to sending it to the second apparatus.

10. The communication system defined in claim 9, wherein to encrypt the data indicative of the transmitted mapping prior to sending it to the second apparatus, the first processing entity is configured for using a private key of a private key/public key pair to encrypt the data indicative of the transmitted mapping, the private key being uniquely known to the first apparatus, the public key being made available to the second apparatus.

11. The communication system defined in claim 5, wherein the first and second processing entities are configured for carrying out a handshaking protocol with one another to securely transmit the transmitted mapping from the first apparatus to the second apparatus.

12. The communication system defined in claim 1, wherein the first mapping is stored in the first memory by a permutation matrix, wherein determining the first output index based on the first input index and the first mapping comprises creating a $2^N$-length input vector with all zeroes except for a "1" in a single position corresponding to the first input index, multiplying the permutation matrix and the input vector to obtain a $2^N$-length output vector having all zeroes except for a "1" in a single position, wherein the first output index is set to equal the position in which the "1" appears in the output vector.

13. The communication system defined in claim 1, wherein the first and second mappings are each one-to-one mappings.

14. The communication system defined in claim 1, wherein for plural successive N-bit first input segments, the first processing entity is configured for:
determining a first input index for each of the first N-bit input segments;
creating a succession of arrays of size $2^N$, each array corresponding to one of the N-bit first input segments and having all zeroes except for a "1" in a single position corresponding to the first input index;
applying each of the arrays to inputs of a $2^N$-input, $2^N$-output switch fabric that implements the mapping, thereby to obtain a succession of output arrays at the outputs of the switch fabric, each of the arrays having all zeroes except for a "1" in a single position;
setting the output index for each of the N-bit output segments to correspond to the position in which the "1" appears in a corresponding one of the output arrays.

15. The communication system defined in claim 1, wherein N is at least as great as 14.

16. The communication system defined in claim 1, the first processing entity being further configured encrypting the first bit stream with an encryption key before said subdividing, the second processing entity being further configured for decrypting the third bit stream with a decryption key corresponding to the encryption key, thereby to recover the first bit stream.

17. The communication system defined in claim 1, the first processing entity being further configured encrypting the second bit stream with an encryption key before said causing, the second processing entity being further configured for decrypting the received bit stream with a decryption key corresponding to the encryption key prior to said subdividing.

18. The communication system defined in claim 1, wherein the first and second apparatuses are mobile communication devices.

19. A method of implementing a secure network amongst a plurality of communication devices, comprising:
determining a mapping between $2^N$ possible input indexes and $2^N$ possible output indexes, where N>1;
securely embedding the mapping within a memory of each of the communication devices;
configuring one or more processors in each of the communication devices to execute a data encoding method when transmitting data to other ones of the communication devices; and
configuring one or more processors in each of the communication devices to execute a data decoding method when processing data received from other ones of the communication devices;
the data encoding and decoding methods comprising:
obtaining an input bit stream;
subdividing the input bit stream into a plurality of N-bit input segments;
producing a plurality of N-bit output segments corresponding to respective ones of the N-bit input segments, wherein a particular one of the N-bit output segments is produced from a particular one of the N-bit input segments by:
determining an input index as a value represented by the N bits of the particular one of the N-bit input segments;
determining an output index based on the input index and the mapping; and
setting the bits of the particular one of the N-bit output segments so as to represent the value of the output index; and
outputting an output bit stream formed using the N-bit output segments.

20. A data protection method comprising:
storing in a computer memory a permutation mapping that maps each possible $2^N$-bit input array having a 1 in a single position and 0s in each of the $2^N$-1 other positions to a respective $2^N$-1 other positions, N being an integer greater than one;
obtaining an input bit stream;
subdividing the input bit stream into a plurality of N-bit input segments stored in the computer memory;
producing, by one or more processors, a plurality of N-bit output segments corresponding to respective ones of the N-bit input segments, the N-bit output segments stored in the computer memory,
wherein a particular one of the N-bit output segments is produced from a particular one of the N-bit input segments by the one or more processors by:
determining a $2^N$-bit input array from the N bits of the particular one of the N-bit input segments;
determining a $2^N$-bit output array based on the $2^N$-bit input array and the permutation mapping; and
setting the bits of the particular one of the N-bit output segments so as to represent the value of the $2^N$-bit output array; and
outputting an output bit stream formed using the N-bit output segments.

21. The method defined in claim 20, wherein determining the $2^N$-bit input array from the N bits of the particular one of the N-bit input segments comprises obtaining a decimal value M corresponding to the particular one of the N-bit input segments and setting the $(M+1)^{th}$ bit of the input array to 1.

22. The method defined in claim 20, wherein determining the $2^N$-bit output array from the $2^N$-bit input array and the permutation mapping comprises carrying out a multiplication between the $2^N$-bit input array and a $2^N$-by-$2^N$ sparse matrix corresponding to the permutation mapping.

23. The method defined in claim 22, wherein the output bit stream comprises a decoded version of data encoded in the input bit stream, the method further comprising encoding the data in the input bit stream using a transpose of the sparse matrix.

24. The method defined in claim 20, wherein the input bit stream comprises encoded data, wherein the output bit stream comprises a decoded version of the data that was encoded in the input bit stream, and wherein the permutation mapping is a transpose of a permutation mapping used to encode the data in the input bit stream.

25. The method defined in claim 20, wherein the output bit stream comprises an encoded version of data in the input bit stream, further comprising sending the permutation mapping to a remote apparatus for decoding of the data in the output bit stream.

26. The method defined in claim 20, wherein the output bit stream comprises an encoded version of data in the input bit stream, further comprising sending the permutation mapping or a transpose of the permutation mapping to a remote apparatus for decoding of the data in the output bit stream.

27. The method defined in claim 26, further comprising sending a flag to the remote apparatus, the flag indicating whether the mapping sent to the remote apparatus is the permutation mapping or a transpose of the permutation mapping.

28. The method defined in claim 20, wherein determining the $2^N$-bit output array from the $2^N$-bit input array and the permutation mapping comprises obtaining the $2^N$-bit output array with all 0s except for a 1 in a single position by combining the $2^N$-bit input array and a matrix representation of the permutation mapping.

29. The method defined in claim 20, further comprising:
determining a respective equivalent input decimal value of each of a plurality of successive ones of the N-bit input segments;
creating a succession of arrays of size $2^N$, each array corresponding to one of the N-bit input segments and having all 0s except for a 1 in a single position corresponding to the respective input decimal value;
applying each of the $2^N$-bit arrays to inputs of a $2^N$-input, $2^N$-output switch fabric that implements the permutation mapping, thereby to obtain a succession of $2^N$-bit output arrays at the outputs of the switch fabric, each of the arrays having all 0s except for a 1 in a single position;
setting each of the N-bit output segments to have a respective equivalent decimal value corresponding to the position in which the 1 appears in a corresponding one of the output arrays.

30. The method defined in claim 20, wherein N is at least as great as 9.

31. The method defined in claim 30, wherein N is not a power of 2.

32. The method defined in claim 20, further comprising changing the value of N during operation.

33. A non-transitory computer-readable storage medium storing instructions which, when executed by at least one processor, cause the at least one processor to execute a method that comprises:
obtaining an input bit stream;
subdividing the input bit stream into a plurality of N-bit input segments stored in the computer memory, N being an integer greater than one;
producing, by one or more processors, a plurality of N-bit output segments corresponding to respective ones of the N-bit input segments, the N-bit output segments stored in the computer memory,
wherein a particular one of the N-bit output segments is produced from a particular one of the N-bit input segments by the one or more processors by:
determining a $2^N$-bit input array from the N bits of the particular one of the N-bit input segments;
determining a $2^N$-bit output array based on the $2^N$-bit input array and a stored permutation mapping that maps each possible $2^N$-bit input array having a 1 in a single position and 0s in each of the $2^N$-1 other positions to a respective $2^N$-bit output array having a 1 in a corresponding single position and 0s in each of the $2^N$-1 other positions; and
setting the bits of the particular one of the N-bit output segments so as to represent the value of the $2^N$-bit output array; and
outputting an output bit stream formed using the N-bit output segments.

34. The non-transitory computer-readable storage medium defined in claim 33, wherein N is at least as great as 9 and is not a power of 2.

35. The non-transitory computer-readable storage medium defined in claim 33, wherein determining the $2^N$-bit input array from the N bits of the particular one of the N-bit input segments comprises obtaining a decimal value M corresponding to the particular one of the N-bit input segments and setting the $(M+1)^{th}$ bit of the input array to 1.

36. The non-transitory computer-readable storage medium defined in claim 33, wherein determining the $2^N$-bit output array from the $2^N$-bit input array and the permutation mapping comprises carrying out a multiplication between the $2^N$-bit input array and a $2^N$-by-$2^N$ sparse matrix corresponding to the permutation mapping.

37. The communication system defined in claim 1, wherein N is at least as great as 9.

38. The communication system defined in claim 37, wherein N is not a power of 2.

39. The communication system defined in claim 37, wherein the value of N is changed dynamically.

40. The communication system defined in claim 1, wherein the first mapping is stored in the first memory by a permutation matrix, wherein determining the first output index based on the first input index and the first mapping comprises creating a $2^N$-length input vector with all zeroes except for a "1" in a single position corresponding to the first input index, and carrying out a position switching operation based on the positions of the 1 values in the permutation matrix to obtain a $2^N$-length output vector having all zeroes except for a "1" in a single position from, wherein the first output index is set to equal the position in which the "1" appears in the output vector.

41. The method defined in claim 20, wherein determining the $2^N$-bit output array from the $2^N$-bit input array and the permutation mapping comprises carrying out a position switching operation based on the positions of the 1 values in a $2^N$-by-$2^N$ sparse matrix representing the permutation mapping.

* * * * *

UNITED STATES PATENT AND TRADEMARK OFFICE
CERTIFICATE OF CORRECTION

PATENT NO. : 10,476,664 B2
APPLICATION NO. : 15/796577
DATED : November 12, 2019
INVENTOR(S) : Randy Kuang It is certified that error appears in the above-identified patent and that said Letters Patent is hereby corrected as shown below:

In the Claims

Column 22, Claim 20, Lines 37-38:
"0s in each of the 2N-1 other positions to a respective 2N-1 other positions"

Should read:
"0s in each of the 2N-1 other positions to a respective 2N bit output array having a 1 in a corresponding single position and 0s in each of the 2N-1 other positions".

Signed and Sealed this
Thirty-first Day of March, 2020

Andrei Iancu
*Director of the United States Patent and Trademark Office*